Dec. 10, 1940.   B. G. BAILEY   2,224,131
COMBINATION WATER HEATER AND DISTILLER
Filed Feb. 11, 1939

INVENTOR.
BURTON G. BAILEY
BY A. B. Bowman
ATTORNEY.

Patented Dec. 10, 1940

2,224,131

UNITED STATES PATENT OFFICE 2,224,131

COMBINATION WATER HEATER AND DISTILLER

Burton G. Bailey, La Mesa, Calif.

Application February 11, 1939, Serial No. 255,953

12 Claims. (Cl. 219—39)

My invention consists of a water heater with a water distilling apparatus in cooperative relation therewith for distilling water for use and the objects of my invention are:

First, to provide a combination water heater and distiller in which the water heating element performs both functions of heating the water and preparing distilled water for use;

Second, to provide a combination water heater and distiller of this class by the use of which vapors created by the heating element are drawn off separately from the water and used as distilled water;

Third, to provide a combination water heater and distiller of this class in which the vapors for creating the distilled water are kept separately and apart from the water heated for general purposes so that the distilled water is pure and not mixed in any way with the undistilled water;

Fourth, to provide a water heater combination with the distiller which is equally efficient for water heating purposes as the conventional type of water heater now in use;

Fifth, to provide a combination water heater and distiller of this class which is automatic in its action throughout;

Sixth, to provide a combination water heater and distiller of this class in which the condensation from vapors from the heater will supply a quantity of distilled water sufficient for general family use; and Seventh, to provide a combination water heater and distiller of this class which is very simple and economical of construction, efficient in its action, and which will not readily deteriorate or get out of order.

Figure 1:
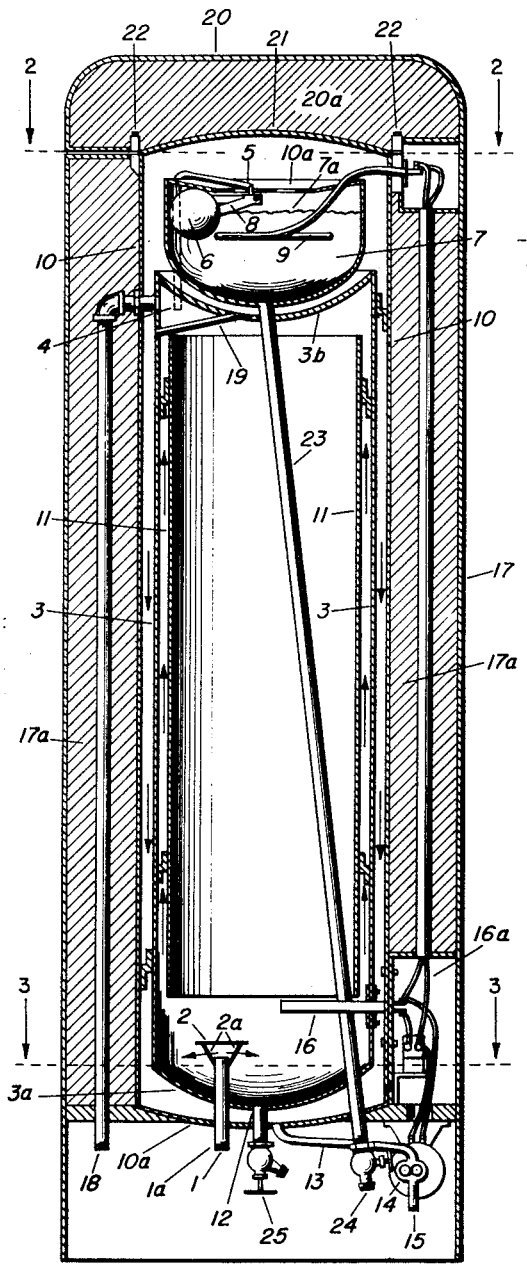
Figure 2:
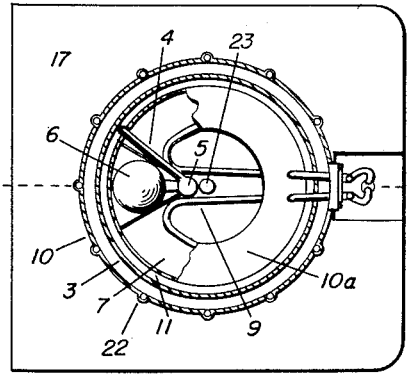
Figure 3:
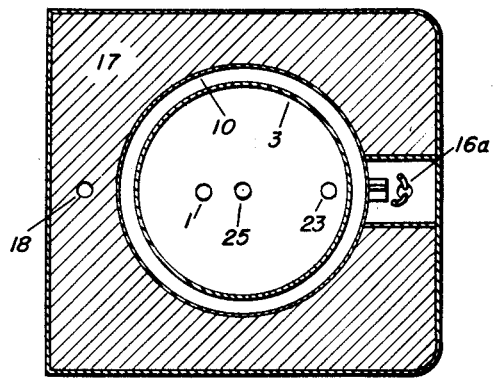

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a sectional view taken from the line 1—1 of Fig. 2 showing some of the parts and portions in elevation to facilitate the illustration; Fig. 2 is a transverse sectional view taken from the line 2—2 of Fig. 1 and Fig. 3 is a transverse sectional view taken from the line 3—3 of Fig. 1.

Similar characters of reference refer to similar parts and portions throughout the several views of the drawing:

The cold water supply pipe 1, cold water deflector 2, tank 3, water conducting tube 4, needle valve 5, float member 6, evaporating basin 7, float lever 8, electric heating coil 9, outer tank 10, cylinder 11, outlet conductor 12, distilled water conductor 13, distilled water pump 14, distilled water supply outlet 15, electrical thermostat 16, insulation tank 17, heated water supply conductor 18, distilled water reserve conductor 19, insulation top member 20, removable dome member 21, bolts 22, clean out pipes 23, clean out pipe valve 24 and clean out valve 25 constitute the principal parts and portions of my combination water heater and distiller.

The cold water supply pipe 1 connects with the main water supply for domestic use at 1a and it extends upwardly into the interior of the tank 3 through the curve shaped bottom portion 3a. This supply pipe 1 is provided on its upper end with a cold water deflector 2 which is a plate supported by means of strips 2a which is adapted to deflect the water outwardly between the strips from the plate portion 2 as shown by arrows in Fig. 1 of the drawing. This tank 3 extends upwardly some distance and is provided at its upper end with a concave top portion 3b. Communicating with the concave portion 3b of the tank 3 near its central portion is a distilled water reserve conductor 19 which extends through the wall of the tank 3 at one side and is adapted to drain any overflow or condensed vapor from said concave portion 3b. Positioned on the interior of the tank 3 concentric therewith is a hollow open ended cylinder member 11, the bottom end of which is some distance above the lower end of the tank 3 and its upper end is some distance below the upper end of the tank 3 as shown best in Fig. 1 of the drawing. Positioned in the insulation 17a and extending slightly below the lower end thereof is a heated water supply conductor 18, the lower end of which is connected with the hot water supply line to the fixtures for use. This conductor extends upwardly in the insulation 17a and then inwardly into the upper end of the tank 3, as shown best in Fig. 1 of the drawing. Positioned around the tank 3 and spaced from the wall thereof is an outer tank 10, the upper end of which extends some distance above the tank 3 and the lower end of which extends some distance below the lower end of the tank 3. It is provided at its lower end with a concave bottom portion 10a leaving a space between the lower end of the tank 3 and the lower end of the tank 10 for holding a supply of condensed distilled water and communicating therewith is a distilled water conductor 13 which connects with a distilled water pump 14 which is motor operated for pumping the distilled water to any place it is desired for use. Connecting with the outlet of the pump 14 is a distilled water supply outlet 15, all as shown best in Fig. 1 of the drawing. It is preferred to operate the pump 14 with an electric motor, of any conventional form of motor and pump.

Communicating with the lower end of the tank 3 is an outlet conductor 12 for cleaning and flushing this tank 3 and at the lower end is provided a clean out valve 25. Positioned in the tank 3 just below the cylinder 11 is an electrical thermostat 16 which is of any conventional type which is electrically connected with a heater, which will be hereinafter described, by the conductors 16a, thus providing means for regulating the heat dependent upon the temperature of the water in the lower portion of the tank 3.

Positioned in the concave portion 3b of the tank 3 and spaced therefrom a slight distance as shown best in Fig. 1 of the drawing is the evaporating basin 7 which is a cup shaped vessel which extends upwardly some distance above the upper end of the tank 3 and into the outer tank 10 and spaced from the walls of said tank 10. It is provided centrally at its lower side with a clean out pipe 23 which extends downwardly through the tank 3, cylinder 11 and out through the lower end of the outer tank 10 and is provided with a clean out pipe valve 24 at its lower end. This evaporating basin 7 is open at its upper side except that it is provided around the inside of its outer edge with inwardly and downwardly sloping flange 10a which is adapted to drain any water that overflows the upper side of the basin 7 because of turbulence in heating the water back into the basin 7 to prevent overflow into the condensed distilled water at the lower side or into the space between the concave portion 3b and the lower side of the basin 7.

Positioned in this basin 7 is the electric heating coil 9 which may be of any conventional type for this purpose and this coil is electrically heated by means of the electrical conductor 16a controlled by the thermostat 16 as hereinbefore described.

Communicating with the upper side of this basin 7 and extending to near the middle over the upper edge is a conductor 4, the lower end of which extends downwardly into the upper end of the tank 3 and is provided with a needle valve 5 in its extended end. This needle valve 5 is controlled and regulated by means of a float member 6 mounted in said basin 7 at one side provided with a float lever 8 which connects with the needle valve 5 for regulating the flow of water to the basin from the tank 3 so that the level of the water is substantially at the point 7a.

The upper end of the outer tank 10 is provided with a removable dome member 21 which is supported by means of bolts 22. Positioned around this outer tank 10 is an insulation casing 17, which extends some distance below the lower end of the outer tank 10 and forms a support for the heater and provides open casing at the lower side for the valves 24, 25, pump 14 and so forth. Positioned between the casing 17 and the outer tank 10 is insulation 17a which may be any form of insulation desired. Also positioned on the upper side of the casing 17 is the insulation top member 20, which is filled with insulation 20a, thus the heater is insulated around all of the tanks and operating parts.

The operation of my combination water heater and distiller is substantially as follows:

Cold water is admitted through the cold water supply pipe 1 and it is deflected and diffused by the deflector 2. The water through this conductor 1 completely fills the tank 3 and enters the water conducting tube 4 at its lower end and the water passes the needle valve 5 and into the basin 7 and the float so controls the level of water through the valve 5 at substantially the point 7a so as to completely submerge the heating coil 9. This coil 9 causes the water in the basin 7 to boil and the steam vapor produced fills the space within the tank 10 and all around the tank 3, the water in which being less than boiling temperature or about 150° absorbs heat of evaporation from the steam and vapor causing it to cool and condense around the tank 3. The water thus heated expands between the cylindrical wall 11 and wall of the tank 3 and rises to the top of the tank, being forced up by cold water from below which replaces it. The condensation around the tank 3 continues to give up its heat into the cold water as it flows down and accumulates at the lower end between the bottoms 3a and 10a of the tanks 3 and 10 as distilled water. This distilled water flows through the pipe 13 to the pump 14 by which it is forced through outlet 15 to any place of storage or use. The evaporation and condensation which causes the water in the tank to be heated will continue until the water surrounding the electrical thermostat 16 becomes hot to cause the thermostat to react, thus opening the electric circuit supplying the heating coil 9 and pump 14. The electricity will then remain off until the water surrounding the thermostat drops below the desired temperature because of cold water replacing hot water drawn off or because of heat loss through insulation 17 to the outside air during long periods when hot water is not being drawn through outlet 18. Distilled water condensed in the concave upper portion 3b of the tank 3 flows out through the tube 19 to its proper place. After the heater and distiller have been in use for several weeks it is necessary to clean. This is done by removing the insulated top 20 exposing the removable dome 21 of tank 10 which is held in place by the bolt 22. With this dome 21 removed the basin 7 may be cleaned and the impurities precipitated by evaporation be flushed through the pipe 23 and hand valve 24. Likewise the tank 3 may be flushed periodically through the valve 25.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a combination service water heater and distiller of the class described, the combination of an outer insulated pressure tank, another pressure tank mounted therein concentric therewith and spaced from the walls thereof at the sides and at its upper and lower ends, a cylinder of smaller diameter than said inner tank positioned concentrically therein spaced from the walls thereof at the sides and at its upper and lower end.

2. In a combination service water heater and distiller of the class described, the combination of an outer insulated pressure tank, another pressure tank mounted therein concentric therewith and spaced from the walls thereof at the sides and at its upper and lower ends, a cylinder of smaller diameter than said inner tank positioned concentrically therein spaced from the walls thereof at the sides and at its upper and lower end, a basin mounted at the upper end of said inner tank in said outer tank and extending considerably above said inner tank, and an electric heating element mounted in said basin.

3. In a combination service water heater and distiller of the class described, the combination of an outer insulated pressure tank, another pressure tank mounted therein concentric therewith and spaced from the walls thereof at the sides and at its upper and lower ends, a cylinder of smaller diameter than said inner tank positioned concentrically therein spaced from the walls thereof at the sides and at its upper and lower end, a basin mounted at the upper end of said inner tank in said outer tank and extending considerably above said inner tank, an electric heating element mounted in said basin, and float means in said basin for controlling the water level in said basin.

4. In a combination service water heater and distiller of the class described, the combination of an outer insulated pressure tank, another pressure tank mounted therein concentric therewith and spaced from the walls thereof at the sides and at its upper and lower ends, a cylinder of smaller diameter than said inner tank positioned concentrically therein spaced from the walls thereof at the sides and at its upper and lower end, a basin mounted at the upper end of said inner tank in said outer tank and extending considerably above said inner tank, an electric heating element mounted in said basin, float means in said basin for controlling the water level in said basin, said basin provided with a baffle member around its upper edge and extending inwardly and downwardly and having a central opening.

5. In a combination service water heater and distiller of the class described, the combination of an outer insulated pressure tank, another pressure tank mounted therein concentric therewith and spaced from the walls thereof at the sides and at its upper and lower ends, a cylinder of smaller diameter than said inner tank positioned concentrically therein spaced from the walls thereof at the sides and at its upper and lower end, a basin mounted at the upper end of said inner tank in said outer tank and extending considerably above said inner tank, an electric heating element mounted in said basin, said basin provided with a baffle member around its upper edge and extending inwardly and downwardly and having a central opening, and thermostat means in said inner tank in electrical connection with said heating element.

6. In a combination service water heater and distiller of the class described, the combination of an outer insulated pressure tank, another pressure tank mounted therein concentric therewith and spaced from the walls thereof at the sides and at its upper and lower ends, a cylinder of smaller diameter than said inner tank positioned concentrically therein spaced from the walls thereof at the sides and at its upper and lower end, a basin mounted at the upper end of said inner tank in said outer tank and extending considerably above said inner tank, an electric heating element mounted in said basin, said basin provided with a baffle member around its upper edge and extending inwardly and downwardly and having a central opening, thermostat means in said inner tank in electrical connection with said heating element, and an outlet conductor communicating with the space between said inner tank and said outer tank at the lower end.

7. In a combination service water heater and distiller of the class described, the combination of an outer insulated pressure tank, another pressure tank mounted therein concentric therewith and spaced from the walls thereof at the sides and at its upper and lower ends, a cylinder of smaller diameter than said inner tank positioned concentrically therein spaced from the walls thereof at the sides and at its upper and lower end, a basin mounted at the upper end of said inner tank in said outer tank and extending considerably above said inner tank, an electric heating element mounted in said basin, said basin provided with a baffle member around its upper edge and extending inwardly and downwardly and having a central opening, thermostat means in said inner tank in electrical connection with said heating element, an outlet conductor communicating with the space between said inner tank and said outer tank at the lower end, and pump means in connection with said outlet conductor.

8. In a combination service water heater and distiller of the class described, the combination of a pair of different diameter fully enclosed pressure sustaining tanks positioned one within the other with spaced walls at the sides and at the upper and lower end, a basin positioned in the space at the upper end, water conducting means communicating with the smaller diameter tank and said basin, and means for heating the water in said basin to boiling point.

9. In a combination service water heater and distiller of the class described, the combination of a pair of different diameter fully enclosed pressure sustaining tanks positioned one within the other with spaced walls at the sides and at the upper and lower end, a basin positioned in the space at the upper end, water conducting means communicating with the smaller diameter tank and said basin, means for heating the water in said basin to boiling point, and a cylinder open at both ends mounted in smaller diameter tanks with its walls spaced from the walls thereof at the sides and at the upper and lower end.

10. In a combination service water heater and distiller of the class described, the combination of a pair of different diameter fully enclosed pressure sustaining tanks positioned one within the other with spaced walls at the sides and at the upper and lower end, a basin positioned in the space at the upper end, water conducting means communicating with the smaller diameter tank and said basin, means for heating the water in said basin to boiling point, a cylinder open at both ends mounted in smaller diameter tanks with its walls spaced from the walls thereof at the sides and at the upper and lower end, and means for conducting water to the upper end of the smaller diameter tank.

11. In a combination service water heater and distiller of the class described, the combination of a pair of different diameter fully enclosed pressure sustaining tanks positioned one within the other with spaced walls at the sides and at the upper and lower end, a basin positioned in the space at the upper end, water conducting means communicating with the smaller diameter tank and said basin, means for heating the water in said basin to boiling point, a cylinder open at both ends mounted in smaller diameter tanks with its walls spaced from the walls thereof at the sides and at the upper and lower end, means for conducting water to the upper end of the smaller diameter tank, and means for controlling the level of water in said basin.

12. In a combination service water heater and distiller of the class described, the combination of a pair of different diameter fully enclosed pressure sustaining tanks positioned one within the other with spaced walls at the sides and at the upper and lower end, a basin positioned in the space at the upper end, water conducting means communicating with the smaller diameter tank and said basin, means for heating the water in said basin to boiling point, a cylinder open at both ends mounted in smaller diameter tanks with its walls spaced from the walls thereof at the sides and at the upper and lower end, means for conducting water to the upper end of the smaller diameter tank, means for controlling the level of water in said basin, and thermostat means in the lower end of said smaller diameter tank provided with electrical connection with said heating element in said basin.

BURTON G. BAILEY.